(12) United States Patent
Fujii (10) Patent No.: US 9,896,059 B2
(45) Date of Patent: Feb. 20, 2018

(54) BUCKLE AND SEAT BELT DEVICE

(71) Applicant: Atsushi Fujii, Tokyo (JP)

(72) Inventor: Atsushi Fujii, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 0 days.

(21) Appl. No.: 15/198,447

(22) Filed: Jun. 30, 2016

(65) Prior Publication Data

US 2017/0001557 A1    Jan. 5, 2017

(30) Foreign Application Priority Data

Jul. 2, 2015    (JP) .................................. 2015-133707

(51) Int. Cl.
*B60R 22/12* (2006.01)
*A44B 11/25* (2006.01)

(52) U.S. Cl.
CPC .......... *B60R 22/12* (2013.01); *A44B 11/2565* (2013.01)

(58) Field of Classification Search
CPC ............................ B60R 22/12; A44B 11/2565
See application file for complete search history.

(56) References Cited

U.S. PATENT DOCUMENTS

| | | | | |
|---|---|---|---|---|
| 4,933,818 A * | 6/1990 | Eckmann | ............ | A44B 11/2523 362/483 |
| 5,176,439 A * | 1/1993 | Kawamura | ........ | A44B 11/2565 362/108 |
| 5,181,773 A * | 1/1993 | Colvin | ............... | A44B 11/2565 280/801.1 |
| 5,892,436 A * | 4/1999 | Blackburn | ......... | A44B 11/2565 180/268 |
| 2002/0122307 A1 | 9/2002 | Ellis et al. | | |
| 2006/0261588 A1 | 11/2006 | Kohama | | |
| 2006/0272138 A1 | 12/2006 | Kohama | | |
| 2006/0285344 A1 | 12/2006 | Kohama et al. | | |
| 2007/0236917 A1 * | 10/2007 | Gray | .................. | A44B 11/2546 362/108 |
| 2010/0013622 A1 * | 1/2010 | Rumps | ............... | A44B 11/2565 340/457.1 |

(Continued)

FOREIGN PATENT DOCUMENTS

| | | |
|---|---|---|
| JP | H5-15813 U | 3/1993 |
| JP | H5-53508 U | 7/1993 |

(Continued)

*Primary Examiner* — Darlene P Condra
(74) *Attorney, Agent, or Firm* — Fitch Even Tabin & Flannery LLP (57) ABSTRACT

A buckle includes a supporting member, a case, a lock portion and an illuminating unit. The case covers the supporting member. The lock portion is supported by the supporting member and is covered by the case to lock or unlock a tongue which is inserted into an insertion hole. An insertion hole is formed between the case and the lock portion. The illuminating unit illuminates both ends of the insertion hole of the tongue. The illuminating unit includes a light emitting unit, a light distribution unit, a first diffusing unit and a second diffusing unit. The light emitting unit emits light. The light distribution unit distributes the light emitted by the light emitting unit to form a first light beam and a second light beam. The first diffusing unit diffuses the first light beam. The second diffusing unit diffuses the second light beam.

6 Claims, 10 Drawing Sheets

(56) References Cited

U.S. PATENT DOCUMENTS

| | | | |
|---|---|---|---|
| 2012/0089302 A1* | 4/2012 | Griffin | B60R 21/00 701/45 |
| 2014/0239853 A1* | 8/2014 | Woodham | F21V 33/0064 315/362 |
| 2014/0266663 A1 | 9/2014 | Schlaps | |
| 2016/0031367 A1* | 2/2016 | Salter | B60Q 3/004 362/583 |
| 2017/0127765 A1* | 5/2017 | Betz | A44B 11/2565 |

FOREIGN PATENT DOCUMENTS

| | | |
|---|---|---|
| JP | 2003-335219 A | 11/2003 |
| WO | 2009/046939 A2 | 4/2009 |

* cited by examiner

BUCKLE AND SEAT BELT DEVICE

CROSS-REFERENCE TO RELATED APPLICATIONS

This application claims the benefit of Japanese Patent Application No. 2015-133707, filed on Jul. 2, 2015, the entire contents of which are hereby incorporated by reference, the same as if set forth at length, the entire of which are incorporated herein by reference.

TECHNICAL FIELD

The present invention relates to a technical field of a buckle used in a seat belt device and the like and a technical field of a seat belt device having the buckle.

BACKGROUND ART

In the seats of various transportation means including automobiles, a seat belt device is attached thereto in order to restrain an occupant with a seat belt to suppress inertial movement in an emergency situation such as in the event of collisions, in which a higher deceleration than a normal traveling condition is applied to a vehicle. Such a seat belt device generally includes a tongue supported by a seat belt and a buckle which is fixed to a vehicle body side so that the tongue is inserted therein and latched thereto in order to allow an occupant to easily buckle the seat belt.

A widely known type of buckles used in conventional seat belt devices includes at least a latch member that enters into a latching hole for a tongue to be latched to the tongue when the tongue is inserted, a latch member locking member that moves with biasing force of a spring to lock the latch member at a latching position of the tongue when the latch member is latched to the tongue, a release operating member that releases the lock state of the latch member locked by the latch member locking member and removes the latch member from the latching hole for the tongue to release the latch state between the latch member and the tongue, and an ejector that presses the tongue in a direction in which the tongue is separated from the buckle when the release operating member releases the latch state between the latch member and the tongue (for example, see JP-U-HOS-015813).

In a seat belt device having such a type of a buckle, when the seat belt is buckled to an occupant, the tongue is inserted into the buckle and the latch member is latched to the tongue whereby the tongue is latched to the buckle. As a result, since the seat belt is buckled to the occupant and the occupant is restrained to the seat belt in the emergency situation, the inertial movement of the occupant is suppressed. Moreover, when the seat belt is unbuckled from the occupant, the release operating member is pressed by the occupant whereby the latch state between the latch member and the tongue is released.

As an example of such a buckle, a so-called illuminated buckle having a light source such as LED in the buckle so that an occupant can easily perceive a tongue insertion hole in the night hours is known. In the illuminated buckle, a printed circuit board and an LED as a light source are provided in the buckle and are fixed so as to correspond to both side portions of the tongue insertion hole.

In such a conventional illuminated buckle device, when an occupant sits on a seat, for example, the LED of the buckle device is operated to emit light to illuminate an insertion hole in a buckle body with the aid of a light guide, and the occupant can easily perceive the insertion hole.

SUMMARY OF INVENTION

Technical Issue

However, in the conventional buckle device, since LEDs for illuminating both sides of the insertion hole are provided independently, a plurality of LEDs which is relatively expensive has to be used and a large number of components are used. Thus, assembling the components require a considerable amount of time and labor.

The present invention has been made in view of the problems and an object thereof is to provide a buckle which can be manufactured at a lower cost by reducing the number of LEDs which are relatively expensive and which can be assembled and manufactured easily and accurately by reducing the number of components and to provide a seat belt device having the buckle.

Solution to Issue

A buckle of the present invention includes a supporting member, a case, a lock portion and an illuminating unit. The case covers the supporting member. The lock portion is supported by the supporting member and is covered by the case to lock or unlock a tongue which is inserted into an insertion hole. An insertion hole is formed between the case and the lock portion. The illuminating unit illuminates both ends of the insertion hole for the tongue. The illuminating unit includes a light emitting unit, a light distribution unit, a first diffusing unit and a second diffusing unit. The light emitting unit emits light. The light distribution unit distributes the light emitted by the light emitting unit to form a first light beam and a second light beam. The first diffusing unit diffuses the first light beam. The second diffusing unit diffuses the second light beam.

In the buckle of the present invention, the illuminating unit includes a light guiding member. The light guiding member guides the light from the light emitting unit to the first and second diffusing units by internal reflections.

In the buckle of the present invention, the light guiding member has a hook portion hooked to the lock portion.

In the buckle of the present invention, the light distribution unit has a light reflecting surface. The light reflecting surface reflects the second light beam.

In the buckle of the present invention, the illuminating unit includes a base unit. The light emitting unit is attached to the base unit. The base unit is attached to the supporting member in parallel to the insertion hole for the tongue.

In the buckle of the present invention, the illuminating unit includes an illumination switch. The illumination switch moves according to attachment and detachment of the tongue. The illumination switch puts the light emitting unit into an on state in a state in which the tongue is not inserted. The illumination switch puts the light emitting unit into an off state in a state in which the tongue is inserted.

A seat belt device includes, at least, a seat belt retractor, the tongue and the buckle. The seat belt retractor winds a seat belt. The tongue is slidably supported on the seat belt pulled from the seat belt retractor. The tongue is detachably engaged with the buckle.

Advantageous Effects of Invention

According to the buckle of the present invention, having such a configuration, the buckle includes the supporting member, the case that covers the supporting member, the lock portion that is supported by the supporting member and covered by the case so as to lock or unlock the tongue inserted therein, and the illuminating unit that illuminates both ends of the insertion hole for the tongue formed between the case and the lock portion. Moreover, the illuminating unit includes one light emitting unit that emits light, the light distribution unit that distributes the light emitted by the light emitting unit to form a first light beam and a second light beam, the first diffusing unit that diffuses the first light beam, and the second diffusing unit that diffuses the second light beam. Therefore, the buckle can be manufactured at a lower cost by reducing the number of LEDs which are relatively expensive and can be assembled and manufactured easily and accurately by reducing the number of components.

Moreover, according to the buckle of the present invention, since the illuminating unit includes the light guiding member that guides light from the light emitting unit to the first and second diffusing units by internal reflections, the light can be guided efficiently.

Moreover, according to the buckle of the present invention, since the light guiding member has the hook portion hooked to the lock portion, the buckle can be assembled easily.

Moreover, according to the buckle of the present invention, since the light distribution unit has the light reflecting surface that reflects the second light beam, the light can be distributed with a simple structure.

Moreover, according to the buckle of the present invention, since the illuminating unit has the base unit to which the light emitting unit is attached and the base unit is attached to the supporting member in parallel to the insertion hole for the tongue, the buckle can be formed in a small and thin profile.

Moreover, according to the buckle of the present invention, the illuminating unit has the illumination switch that moves according to attachment and detachment of the tongue, the illumination switch puts the light emitting unit into the ON state in a state in which the tongue is not inserted, and the illumination switch puts the light emitting unit into the OFF state in a state in which the tongue is inserted. Thus, the occupant can easily perceive the tongue insertion hole in the night hours or the like.

Moreover, the seat belt device according to the present invention includes at least the seat belt retractor that winds the seat belt, the tongue slidably supported on the seat belt pulled from the seat belt retractor, and the buckle detachably engaged with the tongue. The buckle can be manufactured at a lower cost by reducing the number of relatively expensive LEDs used. Moreover, the buckle can be assembled and manufactured easily and accurately by reducing the number of components of the buckle. As a result, the seat belt device can be assembled and manufactured easily and accurately.

DESCRIPTION OF EMBODIMENTS

Hereinafter, an embodiment of the present invention will be described with reference to the drawings.

Figure 1:
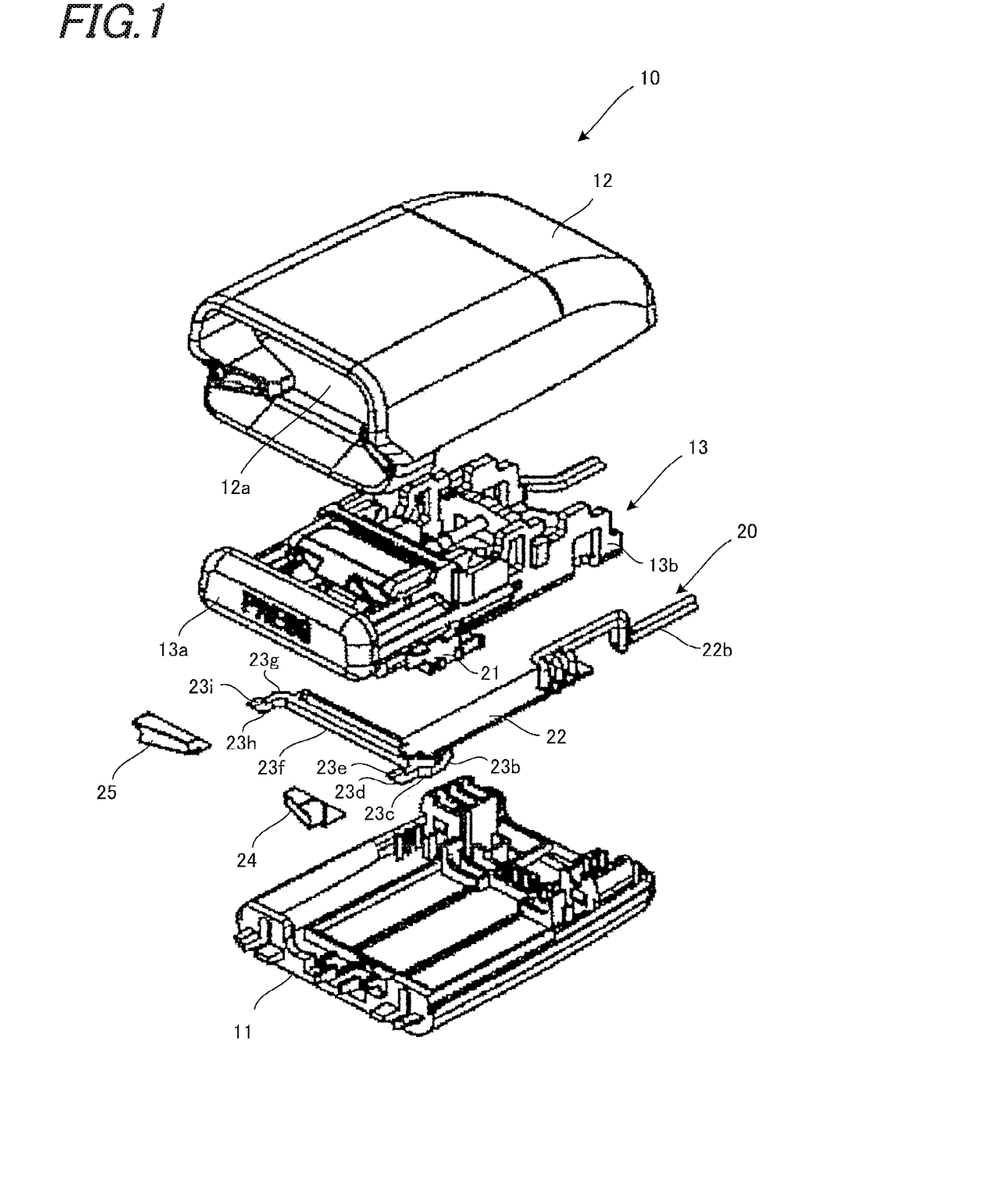
FIG. 1 illustrates an exploded perspective view of a buckle according to the present invention.
Figure 2A:
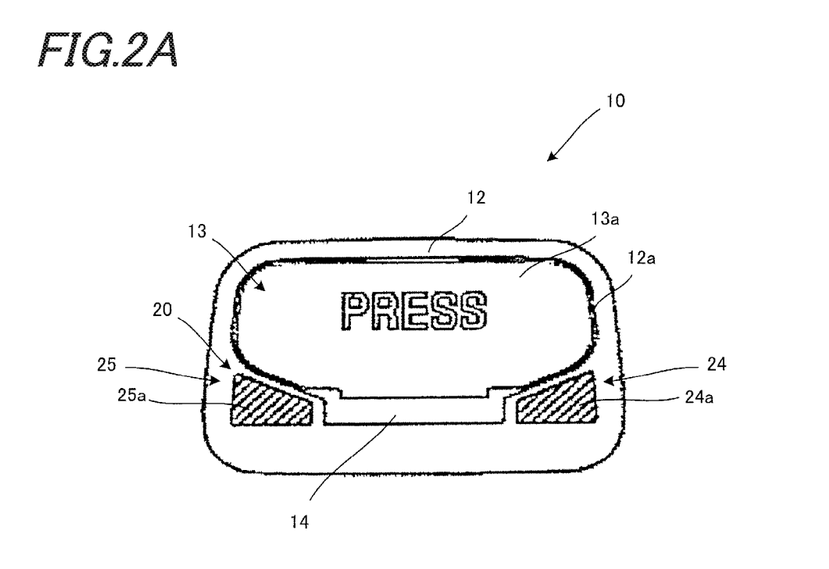
FIGS. 2A and 2B illustrate the buckle according to the present invention.
Figure 2B:
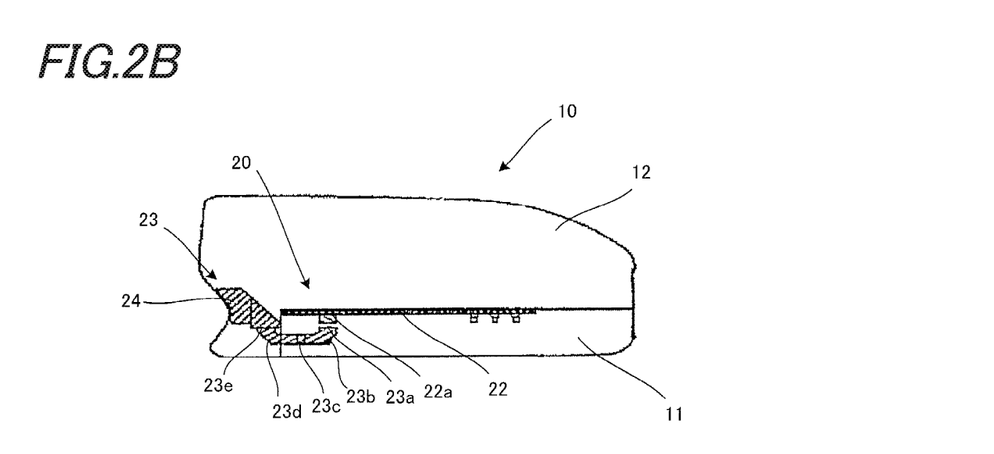

FIG. 1 illustrates an exploded perspective view of a buckle 10 according to the present invention. FIGS. 2A and 2B illustrate the buckle 10 according to the present invention. FIG. 2A is a front view of the buckle 10 and FIG. 2B illustrates a cross-sectional view of a portion of the buckle 10.

The buckle 10 includes a supporting member 11, a case 12 that covers the supporting member 11, a lock portion 13 that is supported by the supporting member 11 and is covered by the case 12 to lock or unlock a tongue (described later), and an illuminating unit 20 that illuminates both ends of an insertion hole 14 for the tongue, formed between the case 12 and the lock portion 13.

The supporting member 11 supports the lock portion 13 and the illuminating unit 20 and is covered by the case 12. Moreover, the insertion hole 14 for the tongue is formed between the case 12 and the lock portion 13.

The case 12 covers the supporting member 11, the lock portion 13, and the illuminating unit 20. The case 12 has an opening 12a and a release button 13a of the lock portion 13 is exposed from the opening 12a.

The lock portion 13 forms an insertion hole 14 in the gap between the release button 13a and the opening 12a of the case 12. The insertion hole 14 is a portion in which the tongue is inserted. A lock plate (not illustrated) is disposed in the lock portion 13, and the lock portion 13 engages with the tongue inserted from the insertion hole 14 to prevent the removal of the tongue.

The release button 13a is always biased in a direction in which the release button 13a protrudes from the case 12, and the latch state of the tongue latched by the lock plate is released when the release button 13a is pressed. Moreover, an illumination switch 21 that is turned on and off according to removal and insertion of the tongue is formed in the lock portion 13. The illumination switch 21 is included in the illuminating unit 20.

Figure 3:
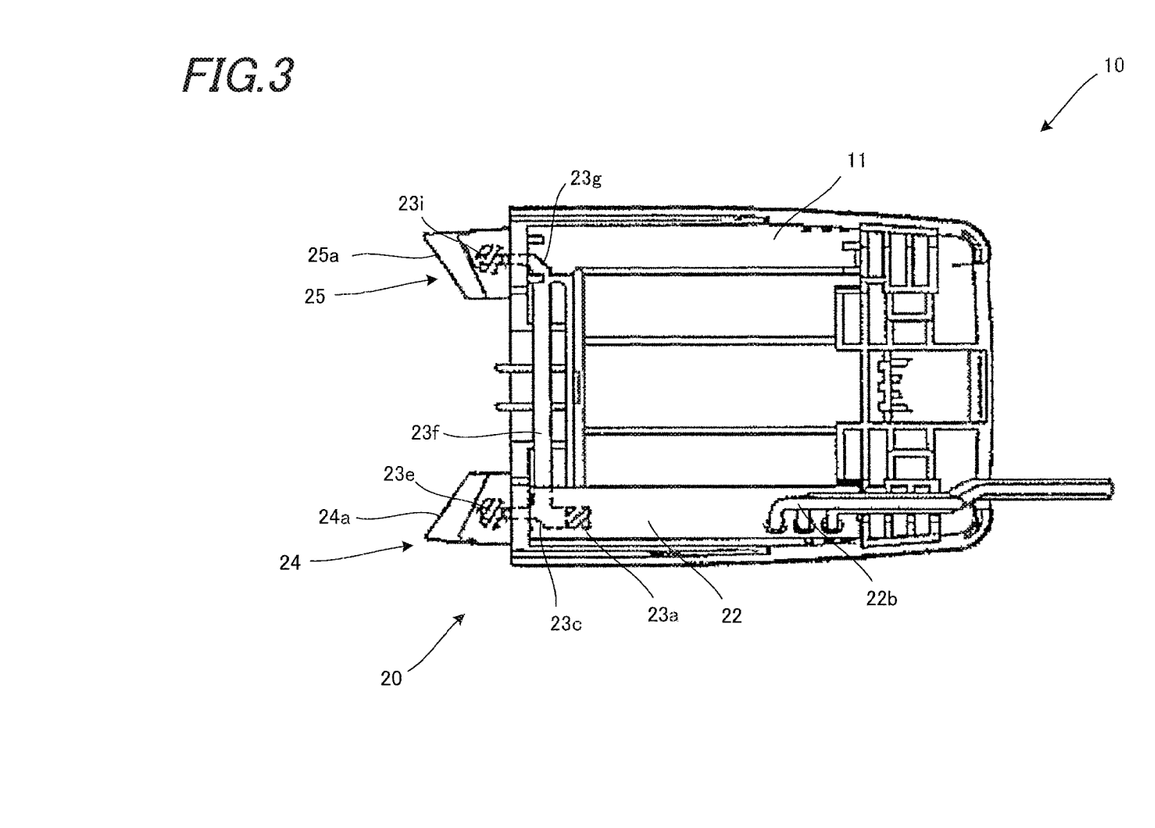
FIG. 3 illustrates a supporting member and an illuminating unit of the buckle according to the present invention.
Figure 4:
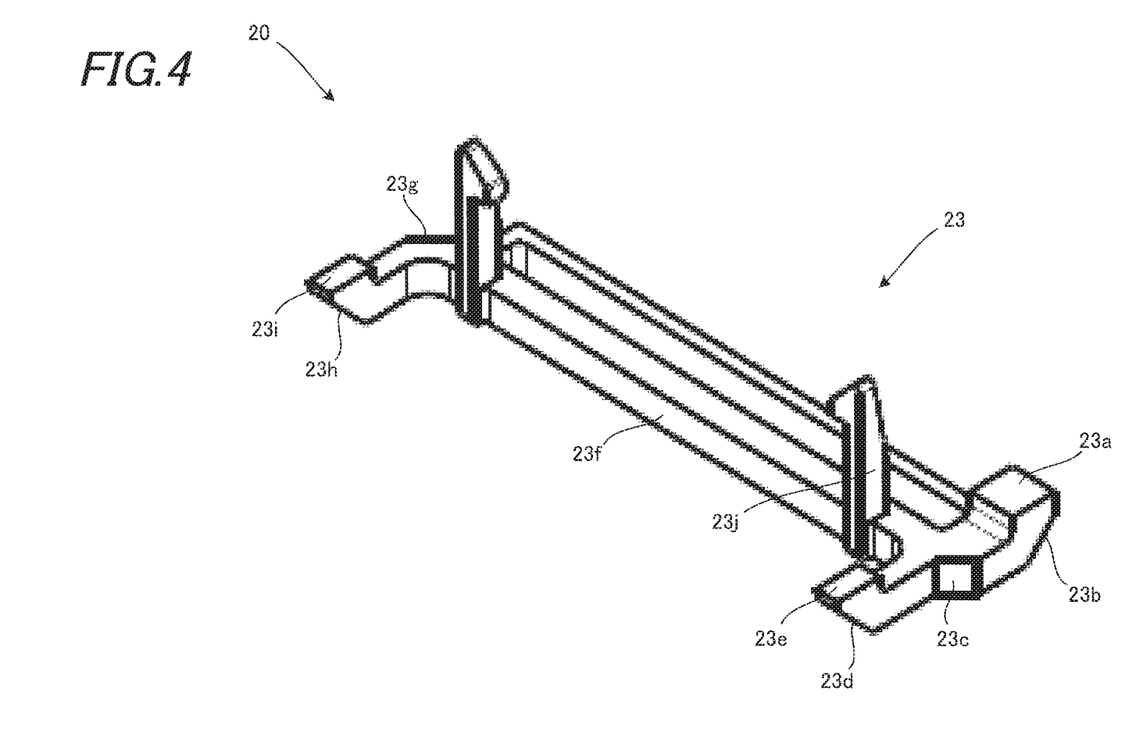
FIG. 4 illustrates a perspective view of a light guiding member of the illuminating unit of the buckle according to the present invention.
Figure 5:
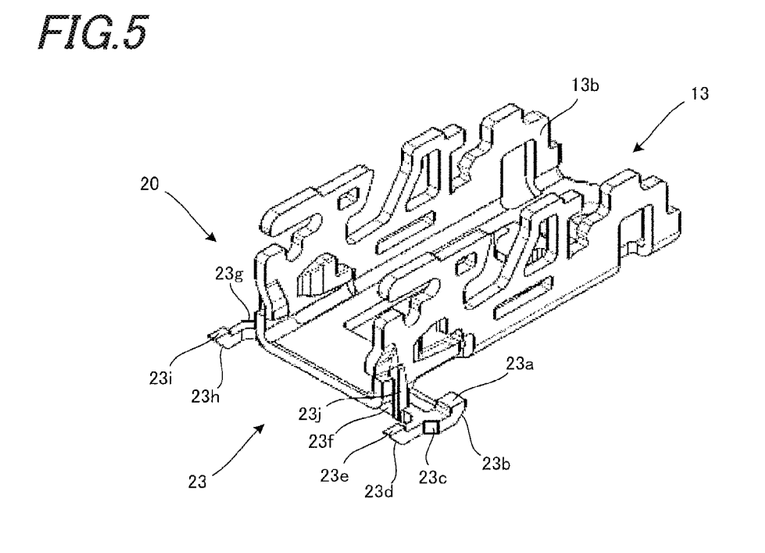
FIG. 5 illustrates a perspective view of the light guiding member of the illuminating unit and a light guiding member supporting portion of a lock portion of the buckle according to the present invention.
Figure 6A:
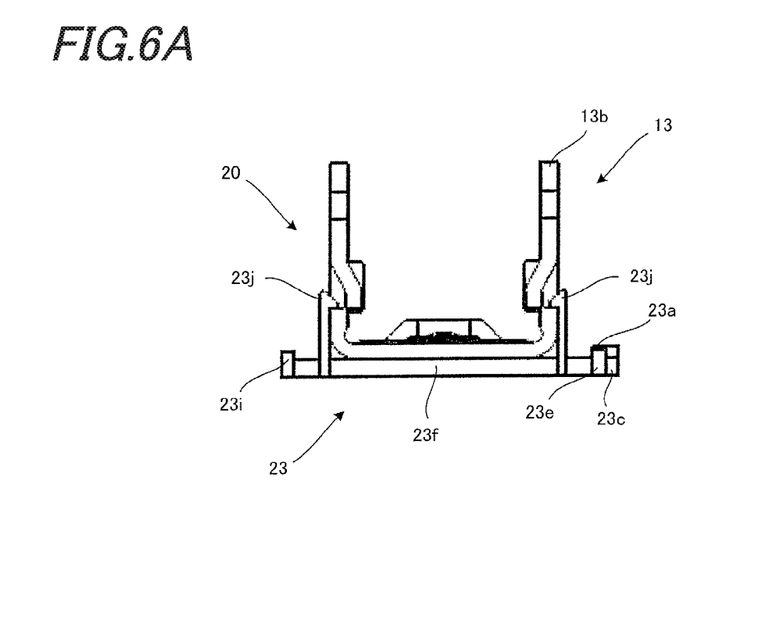
FIGS. 6A and 6B illustrate the light guiding member of the illuminating unit and the light guiding member supporting portion of the lock portion of the buckle according to the present invention.
Figure 6B:
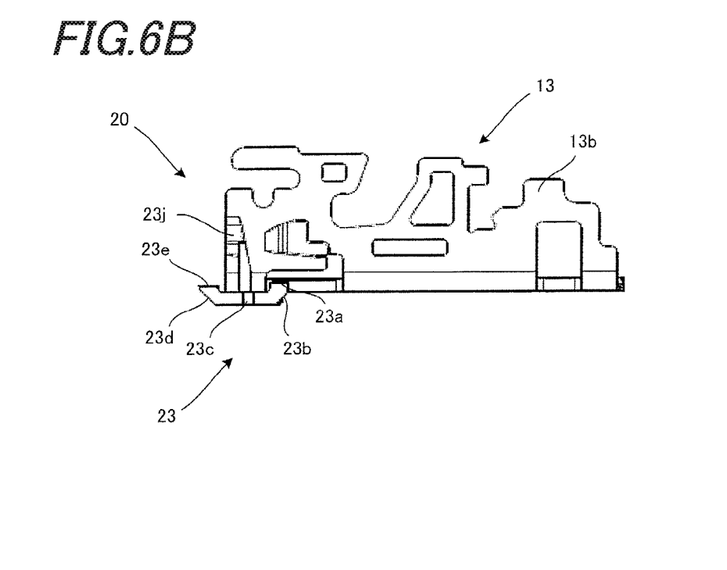

FIG. 3 illustrates the supporting member 11 and the illuminating unit 20 of the buckle 10 according to the present invention. FIG. 4 illustrates a perspective view of a light guiding member 23 of the illuminating unit 20 of the buckle 10 according to the present invention. FIG. 5 illustrates a perspective view of the light guiding member 23 of the illuminating unit 20 and a light guiding member supporting portion 13b of the lock portion 13 of the buckle 10 according to the present invention. FIGS. 6A and 6B illustrate the light guiding member 23 of the illuminating unit 20 and the light guiding member supporting portion 13b of the lock portion 13 of the buckle 10 according to the present invention. FIG. 6A illustrates a front view of the light guiding member 23 of the illuminating unit 20 and the light guiding member supporting portion 13b of the lock portion 13 of the buckle 10 according to the present invention, and FIG. 6B illustrates a side view of the light guiding member 23 of the illuminating unit 20 and the light guiding member supporting portion 13b of the lock portion 13 of the buckle according to the present invention.

A base unit 22 of the illuminating unit 20 is supported by the supporting member 11. An LED 22a that is turned on or off according to the ON or OFF state of the illumination switch 21 is attached to the base unit 22. The LED 22a is connected to a wiring portion (not illustrated) formed on the base unit 22 by printing or the like, and a harness 22b connected to a power supply or the like is connected to the wiring portion.

The light guiding member 23 includes an incidence portion 23a that faces the LED 22a, a first reflecting surface 23b that reflects light coming from the above, incident from the incidence portion 23a toward the front side, a light reflecting surface 23c that forms a portion of a light distribution unit that reflects at least a portion of the light reflected from the first reflecting surface 23b, a second reflecting surface 23d that reflects a first light beam guided outside the light reflecting surface 23c among the light components reflected from the first reflecting surface 23b, a first radiating portion 23e that emits the first light beam reflected from the second reflecting surface 23d, a connection portion 23f that guides a second light beam reflected from the light reflecting surface 23c, a fourth reflecting surface 23h that reflects the second light beam reflected from the third reflecting surface 23g, a second radiating portion 23i that emits the second light beam reflected from the fourth reflecting surface 23h, and a hook portion 23j that is hooked to the light guiding member supporting portion 13b of the lock portion 13.

In the present embodiment, the base unit 22 is formed in parallel to the insertion hole 14 for the tongue 6 on one side of the supporting member 11 corresponding to the first radiating portion 23e. Moreover, the incidence portion 23a and the light reflecting surface 23c of the light guiding member 23 are formed on one side of the supporting member 11. In contrast, the second radiating portion 23i is formed on the other side of the supporting member 11. Thus, the connection portion 23f is disposed so as to cross from one side of the supporting member 11 to the other side.

The light incident from the incidence portion 23a is reflected toward the front side from the first reflecting surface 23b disposed below the incidence portion 23a. The first light beam which is at least a portion of the light reflected from the first reflecting surface 23b passes through a portion of the light distribution unit and is reflected toward the upper side and is emitted from the first radiating portion 23e. The second light beam remaining among the light components reflected from the first reflecting surface 23b is reflected from the light reflecting surface 23c that forms a portion of the light distribution unit, and passes through the connection portion 23f. The second light beam is reflected toward the front side from the third reflecting surface 23g and is reflected toward the upper side from the fourth reflecting surface 23h and is emitted from the second radiating portion 23i.

As described above, the illuminating unit 20 includes the base unit 21 to which the LED 22a is attached, and the base unit 21 is attached to the supporting member 11 in parallel to the insertion hole 14 of the tongue 6. Thus, the buckle 10 can be formed in a small and thin profile.

Moreover, since the illuminating unit 20 includes the light guiding member 23 that guides light from the LED 22a to the first and second reflectors 24 and 25 by internal reflections, it is possible to guide light efficiently.

Moreover, since the light guiding member 23 has the hook portion 23j hooked to the lock portion 13, the buckle 10 can be assembled easily.

Moreover, since the light distribution unit has the light reflecting surface 23c that reflects the second light beam, light can be distributed with a simple structure.

Moreover, in the present embodiment, although a structure that allows a portion of the incident light to pass as it is and reflects the remaining portion of the light from the light reflecting surface 23c is used as the light distribution unit, light may be distributed using a half mirror or the like.

Figure 7:
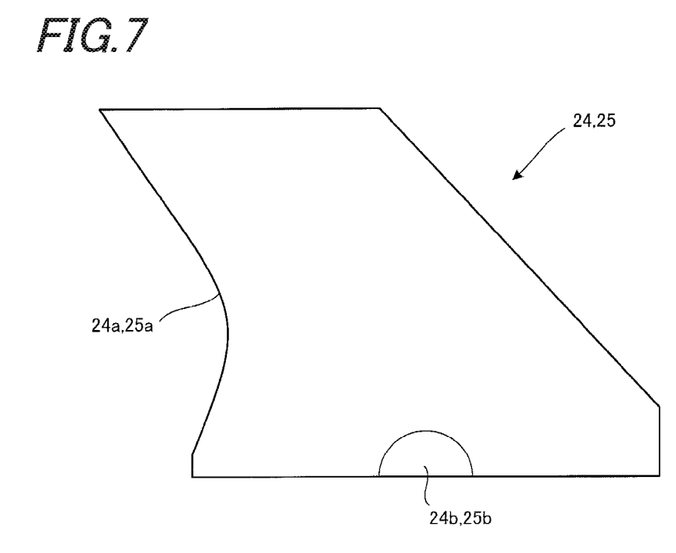
FIG. 7 illustrates a reflector of the buckle according to the present invention. p

FIG. 7 illustrates the reflectors 24 and 25 of the buckle 10 according to the present invention.

The first light beam emitted from the first radiating portion 23e is reflected and diffused by the first reflector 24 and is irradiated from a first irradiation surface 24a. The second light beam emitted from the second radiating portion 23i is reflected and diffused by the second reflector 25 and is irradiated from a second irradiation surface 25a. A first concave diffusion surface 24b and a second concave diffusion surface 25b are formed on the first and second reflectors 24 and 25, respectively, so that light can be diffused sufficiently. The first and second reflectors 24 and 25 are disposed so as to correspond to both ends in the width direction of the insertion hole 14. Moreover, the first and second reflectors 24 and 25 form first and second diffusing units, respectively.

Figure 8A:
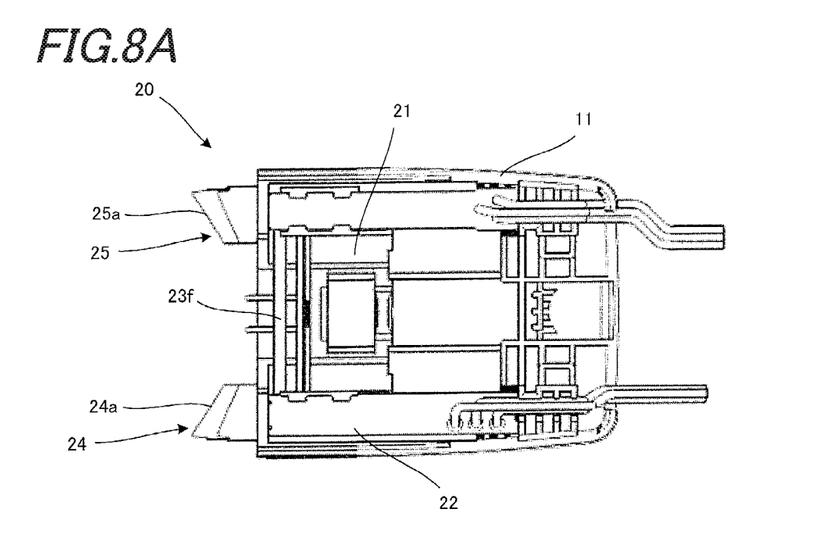
FIGS. 8A and 8B illustrate an ON state of a switch of the illuminating unit of the buckle according to the present invention.
Figure 8B:
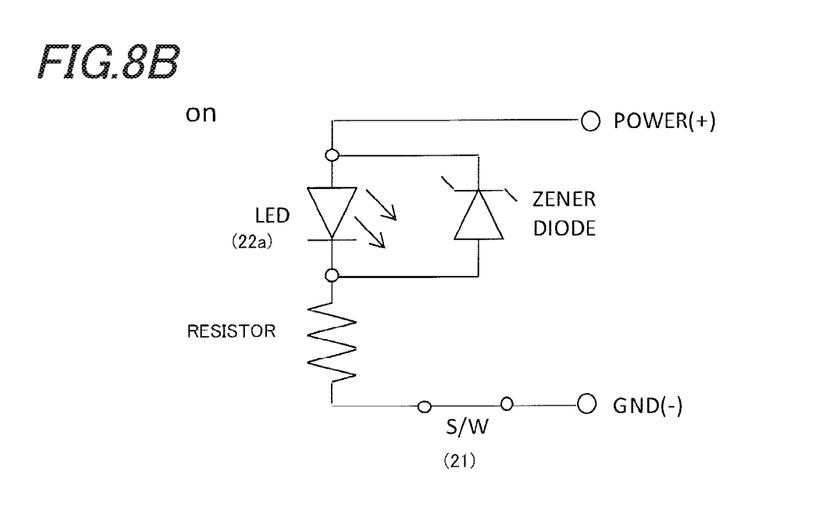
Figure 9A:
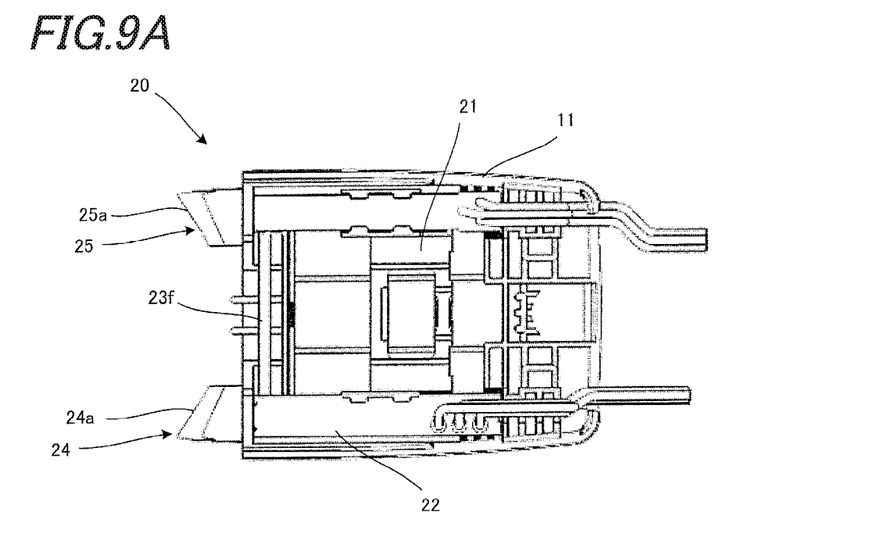
FIGS. 9A and 9B illustrate an OFF state of the switch of the illuminating unit of the buckle according to the present invention.
Figure 9B:
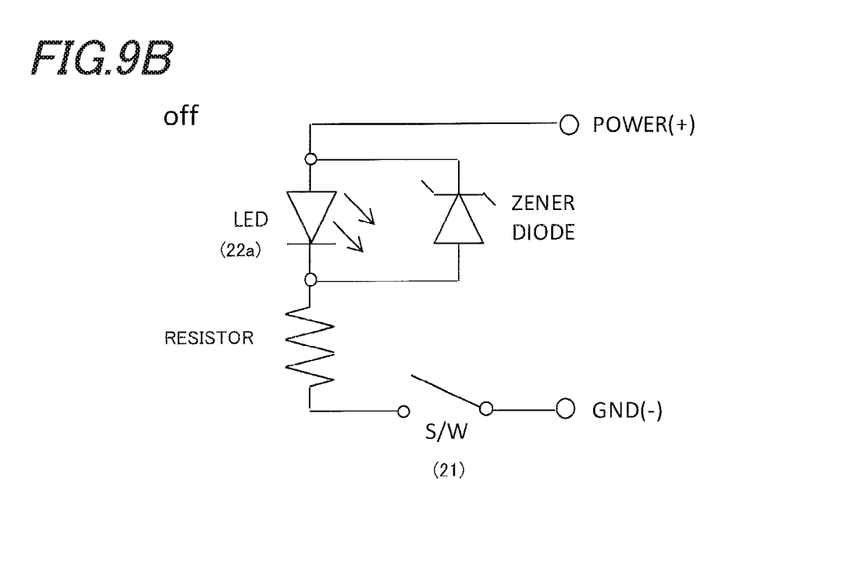

FIGS. 8A and 8B illustrate the ON state of the switch 21 of the illuminating unit 20 of the buckle 10 according to the present invention. FIGS. 9A and 9B illustrate the OFF state of the switch 21 of the illuminating unit 20 of the buckle 10 according to the present invention.

The illumination switch 21 is movably disposed in the supporting member 11. When the tongue is inserted, the illumination switch 21 is pressed by the tongue and is moved along the longitudinal direction of the supporting member 11. Moreover, when the illumination switch 21 moves, the ON/OFF state is switched, and the turning on and off of the LED 22a is switched.

For example, in a state in which the tongue is not inserted as illustrated in FIG. 8A, the illumination switch 21 is in the ON state and the LED 22a is turned on as illustrated in FIG. 8B.

Moreover, in a state in which the tongue is inserted as illustrated in FIG. 9A, the illumination switch 21 is in the OFF state and the LED 22a is turned off as illustrated in FIG. 9B.

As described above, the illuminating unit 20 has the illumination switch 21 that moves according to the attachment and detachment of the tongue 6, and the illumination switch 21 puts the LED 22a into the ON state in a state in which the tongue 6 is not inserted and the illumination switch 21 puts the LED 22a into the OFF state in a state in which the tongue 6 is inserted. Thus, the occupant can easily perceive the tongue insertion hole 14 in the night hours or the like.

Next, an example in which the buckle 10 according to the present invention is applied to a seat belt device of a vehicle will be described.

Figure 10:
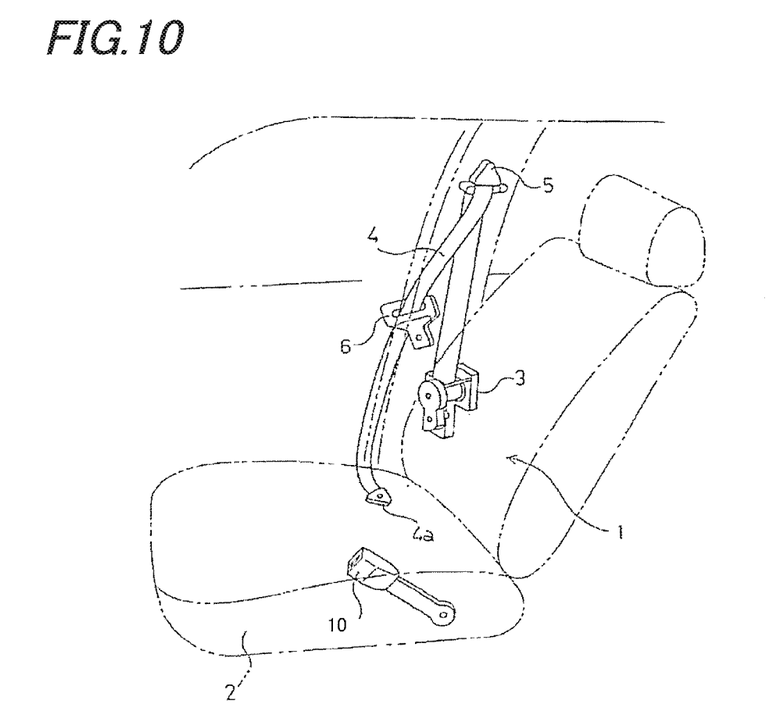
FIG. 10 is a perspective view schematically illustrating a seat belt device having an example of the buckle according to the present invention.

FIG. 10 is a diagram schematically illustrating a seat belt device having an example of the buckle 10 according to the present invention.

As illustrated in FIG. 10, a seat belt device 1 of this example is basically the same as a conventional three-point seat belt device. In the drawing, reference numeral 1 indicates the seat belt device, reference numeral 2 indicates a vehicle seat, reference numeral 3 indicates a seat belt retractor arranged near the vehicle seat 2, reference numeral 4 indicates a seat belt wound so as to be pulled from the seat belt retractor 3 and having a belt anchor 4a at a distal end, fixed to the bottom of a vehicle body or the vehicle seat 2, 5 indicates a guide anchor that guides the seat belt 4 pulled from the seat belt retractor 3 toward the shoulder of the occupant, 6 indicates the tongue slidably supported on the seat belt 4 guided from the guide anchor 5, and 7 indicates a buckle which is fixed to the bottom of the vehicle body or the vehicle seat and in which the tongue 6 is detachably inserted and engaged. The seat belt 4 of the seat belt device 1 is buckled and unbuckled in the same manner as the conventional seat belt device.

The buckle 10 having the above-described configuration can be manufactured at a lower cost by reducing the number of LEDs which are relatively expensive and can be assembled and manufactured easily and accurately by reducing the number of components. As a result, the seat belt device can be assembled and manufactured easily and accurately. Moreover, the LED 22a illustrated in FIG. 7B, of the buckle 10 is configured to be operated to emit light when an ignition switch of the vehicle is turned on or the occupant sits on the seat, for example. When the LED 22a emits light, the insertion hole 14 of the case 11 is illuminated with the aid of the light guiding member 23 and the reflectors 24 and 25. Thus, the occupant can easily perceive the insertion hole 14 easily and the tongue 6 illustrated in FIGS. 9A and 9B can be easily inserted into the insertion hole 14. Moreover, when the tongue 6 is inserted into the inner side from the insertion hole 14 of the buckle 10, the illumination switch 21 is moved and turned off and the LED 22a is turned off.

According to the buckle 10 of the present embodiment, the buckle 10 includes the supporting member 11, the case 12 that covers the supporting member 11, the lock portion 13 that is supported by the supporting member 11 and covered by the case 12 so as to lock or unlock the tongue 6 inserted therein, and the illuminating unit 20 that illuminates both ends of the insertion hole 14 for the tongue 6 formed between the case 12 and the lock portion 13. Moreover, the illuminating unit 20 includes the LED 22a that forms one light emitting unit that emits light, the light reflecting surface 23c that forms the light distribution unit that distributes the light emitted by the LED 22a to form a first light beam and a second light beam, the first reflector 24 that forms the first diffusing unit that diffuses the first light beam, and the second reflector 25 that forms the second diffusing unit that diffuses the second light beam. Therefore, the buckle 10 can be manufactured at a lower cost by reducing the number of LEDs which are relatively expensive and can be assembled and manufactured easily and accurately by reducing the number of components.

Moreover, according to the buckle 10 of the present embodiment, since the illuminating unit 20 includes the light guiding member 23 that guides light from the LED 22a to the first and second reflectors 24 and 25 by internal reflections, the light can be guided efficiently.

Moreover, according to the buckle 10 of the present embodiment, since the light guiding member 23 has the hook portion 23j hooked to the lock portion 13, the buckle 10 can be assembled easily.

Moreover, according to the buckle 10 of the present embodiment, since the light distribution unit has the light reflecting surface 23c that reflects the second light beam, the light can be distributed with a simple structure.

Moreover, according to the buckle 10 of the present embodiment, since the illuminating unit 20 has the base unit 21 to which the LED 22a is attached, and the base unit 21 is attached to the supporting member 11 in parallel to the insertion hole 14 of the tongue 6, the buckle 10 can be formed in a small and thin profile.

Moreover, according to the buckle 10 of the present embodiment, the illuminating unit 20 has the illumination switch 21 that moves according to attachment and detachment of the tongue 6, the illumination switch 21 puts the LED 22a into the ON state in a state in which the tongue 6 is not inserted, and the illumination switch 21 puts the LED 22a into the OFF state in a state in which the tongue 6 is inserted. Thus, the occupant can easily perceive the tongue insertion hole 14 in the night hours or the like.

Moreover, according to the seat belt device 1 of the present embodiment, the seat belt device 1 includes at least the seat belt retractor 3 that winds the seat belt 4, the tongue 6 slidably supported on the seat belt 4 pulled from the seat belt retractor 3, and the buckle 10 with which the tongue 6 is detachably engaged. The buckle 10 can be manufactured at a lower cost by reducing the number of LEDs which is relatively expensive.

Moreover, the buckle 10 can be assembled and manufactured easily and accurately by reducing the number of components of the buckle 10. As a result, the seat belt device 1 can be assembled and manufactured easily and accurately.

The buckle and the seat belt device of the present invention can be ideally used in a buckle of such a type that an occupant perceives a tongue insertion hole in the night hours or the like and a seat belt device of a vehicle having the buckle.

What is claimed is:
1. A buckle comprising:
   a supporting member;
   a case that covers the supporting member;
   a lock portion that is supported by the supporting member and that is covered by the case to lock or unlock a tongue which is inserted into an insertion hole;
   wherein the insertion hole is formed between the case and the lock portion, and
   an illuminating unit that illuminates both ends of the insertion hole for the tongue,
   wherein the illuminating unit includes:
      a light emitting unit that emits light;
      a light distribution unit that distributes the light emitted by the light emitting unit to form a first light beam and a second light beam;
      a first diffusing unit that diffuses the first light beam; and
      a second diffusing unit that diffuses the second light beam,
   wherein the light distribution unit has a light reflecting surface, and
   the light reflecting surface reflects the second light beam.
2. The buckle according to claim 1,
   wherein the illuminating unit includes a light guiding member, and the light guiding member guides the light from the light emitting unit to the first and second diffusing units by internal reflections.

3. The buckle according to claim 2,
wherein the light guiding member has a hook portion hooked to the lock portion.

4. The buckle according to claim 1,
wherein the illuminating unit includes a base unit,
the light emitting unit is attached to the base unit, and
the base unit is attached to the supporting member in parallel to the insertion hole of the tongue.

5. The buckle according to claim 1,
wherein the illuminating unit includes an illumination switch,
the illumination switch moves according to attachment and detachment of the tongue,
the illumination switch puts the light emitting unit into an on state in a state in which the tongue is not inserted, and
the illumination switch puts the light emitting unit into an off state in a state in which the tongue is inserted.

6. A seat belt device comprising at least:
a seat belt retractor that winds a seat belt;
the tongue that is slidably supported on the seat belt pulled from the seat belt retractor; and
the buckle according to claim 1, with which the tongue is detachably engaged.

* * * * *